(12) United States Patent
Haley et al.

(10) Patent No.: US 8,207,255 B2
(45) Date of Patent: Jun. 26, 2012

(54) POLYETHYLENE COMPOSITIONS AND FILMS HAVING IMPROVED STRENGTH AND OPTICAL PROPERTIES

(75) Inventors: Jeffrey C. Haley, Cincinnati, OH (US); Robert L. Sherman, Jr., Blue Ash, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 12/806,938

(22) Filed: Aug. 24, 2010

(65) Prior Publication Data

US 2012/0053301 A1  Mar. 1, 2012

(51) Int. Cl.
*C08K 3/22* (2006.01)
(52) U.S. Cl. ...................................... 524/430
(58) Field of Classification Search ............... 524/430
See application file for complete search history.

(56) References Cited

U.S. PATENT DOCUMENTS

| | | | |
|---|---|---|---|
| 2,915,475 A | 12/1959 | Bugosh | |
| 3,624,003 A * | 11/1971 | Conde et al. | 502/64 |
| 6,627,324 B1 | 9/2003 | Eggers et al. | |
| 2005/0234137 A1* | 10/2005 | Espinoza et al. | 518/716 |
| 2006/0074168 A1* | 4/2006 | Nelson et al. | 524/445 |
| 2006/0283093 A1* | 12/2006 | Petrovic et al. | 51/307 |
| 2009/0198032 A1 | 8/2009 | Torkelson | |

FOREIGN PATENT DOCUMENTS

| | | |
|---|---|---|
| DE | 102004009582 | 9/2005 |
| WO | WO 2006/131450 | 12/2006 |
| WO | WO 2008/097086 | 8/2008 |
| WO | WO2008/112050 A1 | 9/2008 |

OTHER PUBLICATIONS

Rolf Mülhaupt., "Boehmite Nanorod-Reinforced-Polyethylenes and Ethylene/1-Octene Theremoplastic Elastomer Nanocomposites Prepared by In Situ Olefin Polymerization and Melt Compounding," Journal of Polymer Science: Part A: Polymer Chemistry, vol. 46, (2008), 2755-2765.
PCT International Search Report and Written Opinion mailed Nov. 14, 2011, for PCT Application No. PCT/US2011/048055.

* cited by examiner

Primary Examiner — Peter Szekely

(57) ABSTRACT

A polyethylene composition comprising 0.01% to 1% by weight of at least one platelet-shaped nano boehmite nucleator, wherein the platelet-shaped nano boehmite nucleator comprises at least 70% by weight of $Al_2O_3$ and has a crystallite size of at least 5 nm, and the polyethylene composition comprises a density greater than 0.94 g/cm³, a melt index ($MI_2$) ranging from equal to or greater than 0.3 g/10 min. up to equal to or less than 3 g/10 min., and a peak crystallization temperature ($T_c$) value determined according to ASTM D 3418, with an annealing temperature of 160° C. and a cooling rate of 10° C./min., that corresponds to formula (I):

$$T_c \leq (A * \text{density}) - 73.5° \text{ C.} \quad (I)$$

where $A$ is 200 cm³-° C./g, $T_c$ is in units of ° C., and density is in units of g/cm³.

9 Claims, No Drawings

POLYETHYLENE COMPOSITIONS AND FILMS HAVING IMPROVED STRENGTH AND OPTICAL PROPERTIES

FIELD OF INVENTION

The present inventive subject matter generally relates to novel polyethylene compositions and films comprising medium molecular weight, high-density polyethylene (MMW-HDPE), and at least one nano boehmite nucleator from a particular class of nano boehmites.

BACKGROUND OF INVENTION

Nano alumina compositions are generally well-known in the art. In particular, U.S. Pat. No. 2,915,475 describes a process for producing nano alumina fibrils by heating alumina in an aqueous acid dispersion to produce fibrous alumina monohydrate having a boehmite crystal lattice. As discussed in detail in the aforementioned U.S. patent, many factors affect the formation and size of the alumina fibrils, including process time and temperature, acid concentration, and alumina concentration. Additionally, U.S. Pat. No. 2,915,475 discloses that the nano alumina fibrils produced by the process discussed therein can be used for a variety of applications, including as a thickening, emulsifying, dispersing, and suspending agent, as well as a filler for elastomeric materials and plastics for improving strength and/or abrasion resistance, including tensile and impact strength. However, one of the major drawbacks of using nano alumina fibrils, such as those described in U.S. Pat. No. 2,915,475 as additives in polymeric materials, in particular in polyolefinic materials, is that the fibrils agglomerate within the polyolefinic material. This results in a reduced dispersion of the nano alumina fibrils, as well as a reduced interfacial adhesion between the polyolefinic material and the fibrils, which results in the polyolefinic material having reduced physical and mechanical properties, especially with respect to polyethylene films. Additionally, nano alumina fibrils can negatively affect the optical properties of polyolefinic materials, such as polyethylene films, including reducing transparency, increasing haze, and increasing undesirable coloring of the material.

In order to overcome these deficiencies, International Application Publication WO 2006/131450 relates to polyolefin nanocomposite materials having a polyolefin and at least one nanosize mineral filler. However, not only do the polyolefin nanocomposite materials disclosed therein generally relate to propylene polymer compositions, but a myriad of compounds are described as being suitable nanosize fillers, including nanohydrotalcites and phyllosilicates, with smectite clays, kaolin clay, attapulgite clay, bentonite clay, and montomorillonite clays being preferred.

Additionally, International Application Publication WO 2008/097086 relates to stretched polyolefin materials having nano-nucleating agents therein. However, as with WO 2006/131450, not only does International Application. Publication WO 2008/097086 preferably relate to polypropylene materials, but the nano-nucleating agents are generally described as being selected from a variety of compounds, including natural or synthetic nanoclays, modified nanoclays, zeolites, alumina, silica, and fibrous or needle-shaped materials, including metal whiskers, carbon whiskers, or nanotubes. In particular, suitable nano-nucleating agents are described as smectite clays, including montmorillonite, and needle-shaped materials, as well as zeolites, including ZSM-5, zeolite beta, mordenite, ferrierite, and zeolite Y.

Furthermore, German Patent Application DE 10 2004 009 582 relates to boehmitic aluminum hydroxide nanocrystals as fillers for polymeric material. However, as with WO 2006/131450 and WO 2008/097086, German Patent Application DE 10 2004 009 582 relates to various boehmitic aluminum hydroxide nanocrystals, including fibrous particle shapes, as well as a wide variety of polymeric materials.

Contrastingly, work done by Rolf Mülhaupt, *Boehmite Nanorod-Reinforced-Polyethylenes and Ethylene/1-Octene Theremoplastic Elastomer Nanocomposites Prepared by In Situ Olefin Polymerization and Melt Compounding, Journal of Polymer Science*: Part A: Polymer Chemistry. Vol. 46. 2755-2765, 2008, relates to nanocomposites of high-density polyethylene (HDPE) and poly(ethylene-co-1-octene) thermoplastic elastomers having nano boehmite fillers therein. However, not only do the nano boehmite fillers need to be incorporated in situ in the olefin polymerization process, but various nano boehmites are discussed, with the preferred nano boehmite fillers being rod-shaped. Additionally, for improved strength, the resultant polyethylene materials have at least 4% by weight, all the way up to 75% by weight, of the nano boehmite fillers present.

Therefore, there remains a need in the art for polyethylene compositions and films having improved strength and optical properties, with a minimum amount of nano boehmite nucleator present.

SUMMARY OF INVENTION

The present inventive subject matter generally relates to novel polyethylene compositions comprising 0.01% to 1% by weight of at least one platelet-shaped nano boehmite nucleator, wherein the platelet-shaped nano boehmite nucleator comprises at least 70% by weight of $Al_2O_3$ and has a crystallite size of at least 5 nm, and the polyethylene composition has a density greater than 0.94 g/cm$^3$, a melt index (MI$_2$) ranging from equal to or greater than 0.3 g/10 min. up to equal to or less than 3 g/10 min., and a peak crystallization temperature ($T_c$) value determined according to ASTM D 3418, with an annealing temperature of 160° C. and a cooling rate of 10° C./min., that corresponds to formula (I):

$$T_c \leq (A^* \text{density}) - 73.5° C. \qquad (I)$$

where A is 200 cm$^3$-° C./g, $T_c$ is in units of ° C., and density is in units of g/cm$^3$.

Moreover, the present inventive subject matter generally relates to novel polyethylene films comprising a polyethylene composition, the polyethylene composition comprising 0.01% to 1% by weight of at least one platelet-shaped nano boehmite nucleator, wherein the platelet-shaped nano boehmite nucleator comprises at least 70% by weight of $Al_2O_3$ and has a crystallite size of at least 5 nm, and the polyethylene composition has a density greater than 0.94 g/cm$^3$; a melt index (MI$_2$) ranging from equal to or greater than 0.3 g/10 min. up to equal to or less than 3 g/10 min.; and a peak crystallization temperature ($T_c$) value determined according to ASTM D 3418, with an annealing temperature of 160° C. and a cooling rate of 10° C./min., that corresponds to formula (I):

$$T_c \leq (A^* \text{density}) - 73.5° C. \qquad (I)$$

where A is 200 cm$^3$-° C./g, $T_c$ is in units of ° C., and density is in units of g/cm$^3$.

DETAILED DESCRIPTION OF INVENTION

The present inventive subject matter generally relates to novel polyethylene compositions and films comprising a medium molecular weight, high-density polyethylene (MMW-HDPE) composition, and at least one nano boehmite nucleator from a particular class of nano boehmites. In particular, in preferred embodiments, the polyethylene compositions and films not only have improved strength and optical properties, but the compositions and films also comprise low amounts of a nano boehmite nucleator.

Medium Molecular Weight, High-Density Polyethylene (MMW-HDPE) Compositions:

Generally, the polyethylene compositions useful in the present subject matter are medium molecular weight, high-density polyethylene homopolymers or copolymers, with the copolymers having up to 10% by weight of at least one comonomer. The comonomer can be selected from $C_3$-$C_{10}$ α-olefins, preferably $C_3$-$C_6$ α-olefins, including, but not limited to, propylene, butene-1, hexene-1, and octene-1.

Additionally, the medium molecular weight, high-density polyethylene compositions have a density greater than 0.94 g/cm³ according to ASTM D 1505, a melt index ($MI_2$) according to ASTM D 1238 at 190° C./2.16 kg ranging from equal to or greater than 0.3 g/10 min. up to equal to or less than 3 g/10 min., and a peak crystallization temperature ($T_c$) value determined according to ASTM D 3418, with an annealing temperature of 160° C. and a cooling rate of 10° C./min., that corresponds to formula (I):

$$T_c \leq (A * \text{density}) - 73.5° \text{ C.} \qquad (I)$$

where A is 200 cm³-° C./g, $T_c$ is in units of ° C. and density is in units of g/cm³.

In particularly preferred embodiments, the medium molecular weight, high-density polyethylene compositions can have a density greater than or equal to 0.95 g/cm³, and a melt index according to ASTM D 1238 at 190° C./2.16 kg ranging from equal to or greater than 1 g/10 min. up to equal to or less than 2.5 g/10 min. Non-limiting examples of preferred medium molecular weight, high-density polyethylene compositions useful for the present subject matter include Alathon® M6020, L5885, M5010, and M6010 available from Equistar Chemicals, LP.

Platelet-Shaped Nano Boehmite Nucleators:

The nano boehmite nucleators of the present subject matter comprise at least 70% by weight of $Al_2O_3$, preferably comprise at least 80% by weight of $Al_2O_3$, and are platelet-shaped. In this regard, the nano boehmite nucleators have a crystallite size of at least 5 nm in length and width, preferably have a crystallite size of 5 nm to 80 nm in length and width, and more preferably have a crystallite size of 20 nm to 60 nm in length and width. In particularly preferred embodiments, the platelet-shaped nano boehmite nucleators have a crystallite size of about 40 nm in length and width. Additionally, the platelet-shaped nano boehmite nucleators can form particles having a particle size ($d_{50}$) of at least 5 μm, preferably having a particle size ($d_{50}$) ranging from 5 μm to 150 μm, and more preferably can form particles having a particle size ($d_{50}$) ranging from 25 μm to 60 μm. In particularly preferred embodiments, the platelet-shaped nano boehmite nucleators can form particles having a particle size ($d_{50}$) of about 40 μm.

Moreover, in preferred embodiments, the platelet-shaped nano boehmite nucleators of the present subject matter can have a surface area of 50 m²/g to 250 m²/g (BET after activation at 550° C. for 3 hours), and preferably have a surface area of about 100 m²/g, as well as can have a pore volume of 0.4 mL/g to 1 mL/g after activation for 550° C. for 3 hours, and preferably have a pore volume of about 0.5 mL/g to about 0.7 mL/g.

Furthermore, in preferred embodiments, the platelet-shaped nano boehmite nucleators of the present subject matter can have a loose bulk density of 300 g/L to 900 g/L, preferably 500 g/L to 700 g/L, and can have a packed bulk density of 500 g/L to 1000 g/L, preferably 700 g/L to 800 g/L.

Generally the platelet-shaped nano boehmite nucleators of the present subject matter are present in the medium molecular weight, high-density polyethylene composition in relatively low amounts. In this regard, the platelet-shaped nano boehmite nucleators are present in the medium molecular weight, high-density polyethylene composition ranging from 0.01% to 1% by weight, preferably from 0.01% to 0.5% by weight, and even more preferably from 0.05% to 0.1% by weight. Non-limiting examples of particularly preferred platelet-shaped nano boehmite nucleators useful for the present subject matter include Pural® and Catapal® boehmites, such as Catapal® 200 and Pural® 200, available from Sasol Germany GmbH.

The platelet-shaped nano boehmite nucleators of the present subject matter can be added to the medium molecular weight, high-density polyethylene composition by a variety of methods well-known to those skilled in the art, including, but not limited to, various compounding techniques. In particular preferred embodiments, the medium molecular weight, high-density polyethylene composition and the nano boehmite nucleator are compounded together using a single-screw extruder, a reciprocating single-screw mixer, a twin-screw extruder, or a high-intensity batch or continuous internal mixer. The compounded compositions can be formed either by directly compounding the medium molecular weight, high-density polyethylene composition and the nano boehmite in the final intended ranges, or by first compounding the components to form a masterbatch of the nano boehmite in the high density polyethylene at concentrations of 0.2 to 10%, and then letting down the masterbatch into the useful ranges by subsequent compounding with additional high density polyethylene.

Polyethylene Film:

The polyethylene films of the present subject matter generally comprise the medium molecular weight, high-density polyethylene composition, which comprises the platelet-shaped nano boehmite nucleators of the present subject matter, while the resultant polyethylene films have a unique and improved balance of physical and optical properties.

In preferred embodiments of the present subject matter, the polyethylene film can comprise a crystallization half-time reduction of at least 15%, versus a polyethylene film comprising the same high-density polyethylene composition without the platelet-shaped nano boehmite nucleator. Additionally, in preferred embodiments of the present subject matter, the polyethylene film can comprise a dart drop value increase of at least 30%, versus a polyethylene film comprising the same medium molecular weight, high-density polyethylene composition without the platelet-shaped nano boehmite nucleator. Furthermore, in preferred embodiments, the polyethylene film can comprise a MD tear strength increase of at least 25%, versus a polyethylene film comprising the same medium molecular weight, high-density polyethylene composition without the platelet-shaped nano boehmite nucleator.

In yet other preferred embodiments, the polyethylene film can comprise a MD tear strength increase of at least 25% versus a polyethylene film comprising the same medium molecular weight, high-density polyethylene composition without the platelet-shaped nano boehmite nucleator, and can comprise a haze reduction of at least 10% versus a polyethylene film comprising the same medium molecular weight, high-density polyethylene composition without the platelet-shaped nano boehmite nucleator.

The films of the present subject matter can be produced by a variety of methods well-known to those skilled in the art, and can include blown films. Additionally, films of the present subject matter can have a thickness ranging from 0.5 mil. to 10 mil., and preferably have a thickness ranging from 1 mil to 3 mil.

EXAMPLES

The following examples are illustrative of preferred compositions, and are not intended to be limitations thereon. All percentages are based on the percent by weight of the polyethylene composition prepared, unless otherwise indicated, and all totals equal 100% by weight.

Test Methods:
Dart prop (g): Measurements were made following ASTM D1709, using a dart drop height of 26 in (F50).
Tear Strength (g): Elmendorf tear strength in the machine direction (MD) and transverse direction (TD) was obtained following the method described in ASTM D1924.
Haze (%): Film haze measurements were made following ASTM D1003. Narrow Angle Scatter: Film NAS measurements were made following ASTM D1746.
Gloss: Gloss was measured at 45 degrees following the method of ASTM D2457. Impact Flat (ft-lb): Film impact energies were measured following the method of ASTM D4272.
1% Secant Modulus (psi): The film modulus was measured following the method of ASTM E111.
Crystallization Half-time (min.): Crystallization half-time was measured at 125° C. following the procedure outlined in ISO 11357-7. All samples were annealed at 160° C. for 5 minutes prior to the test.

Control Example A

Alathon® M6020, a medium molecular weight, high-density polyethylene resin having a density of 0.960 g/cm$^3$ according to ASTM D 1505, a melt index of 2.0 g/10 min. at 190° C./2.16 kg, and a peak crystallization temperature ($T_c$) value of 118.4° C., corresponding to formula (I), determined according to ASTM D 3418, with an annealing temperature of 160° C. and a cooling rate of 10° C./min., was strand pelletized using a co-rotating, twin-screw extruder. The pelletized resin was then processed by conventional blown film extrusion with a 4" diameter die at 50 lbs/hr., 8" frost line height, and 2.2:1 blow up ratio, to produce a 1.25 mil and a 2.5 mil-thick blown film. The films were then tested, with the results for the 1.25 mil film reported in Table 1, and the results for the 2.5 mil film reported in Table 2.

Example 1

Platelet-Shaped Nano Boehmite Nucleator

Control Example A was repeated, with the exception that 1000 ppm (0.1% by weight) of Capatal® 200, a platelet-shaped nano boehmite nucleator having at least 70% by weight of Al$_2$O$_3$, and a crystallite size of at least 5 nm available from Sasol Germany GmbH, was compounded with the medium molecular weight, high-density polyethylene resin.

Comparative Example 1

Talc

Control Example A was repeated, with the exception that 1000 ppm (0.1% by weight) of ULTRATALC® 609, a talc composition having 60%-100% by weight of talc, 1%-5% by weight of chlorite-group minerals, and 0.1%-1.0% by weight of quartz, available from Barretts Minerals Inc., was compounded with the medium molecular weight, high-density polyethylene resin.

Comparative Example 2

Talc

Control Example A was repeated with the exception that 1000 ppm (0.1% by weight) of Jetfine® 3CA talc, available from Luzenac (Rio Tinto Minerals), was compounded with the medium molecular weight, high-density polyethylene resin.

Comparative Example 3

Kaolin Clay

Control Example A was repeated with the exception that 1000 ppm (0.1% by weight) of POLYPLATE™ P01 kaolin clay, available from KaMin LLC, was compounded with the medium molecular weight, high-density polyethylene resin.

Comparative Example 4

Boron Nitride

Control Example A was repeated with the exception that 1000 ppm (0.1% by weight) of PolarTherm® Boron Nitride PT110, a hexagonal platelet-shaped boron nitride crystal powder having an average particle size of about 45 µm, a crystallite size of about 45 µm, and a surface area of about 0.6 m$^2$/g, available from Momentive Performance Materials Inc., was compounded with the medium molecular weight, high-density polyethylene resin.

Comparative Example 5

Non-platelet-shaped nano boehmite

Control Example A was repeated with the exception that 1000 ppm (0.1% by weight) of Dispal X0, a non-platelet shaped nana boehmite having an average crystallite size of about 80 nm by 10 nm, available from Sasol Germany GmbH, was compounded with the medium molecular weight, high-density polyethylene resin.

Comparative Example 6

Hostalen GD 9550 F, a medium molecular weight, high-density polyethylene resin having a density of 0.951 g/cm$^3$ according to ASTM D 1505, a melt index of 0.9 g/10 min. at 190° C./2.16 kg, and a peak crystallization temperature ($T_c$) value of 118.1° C., that does not correspond to formula (I), determined according to ASTM D 3418, with an annealing temperature of 160° C. and a cooling rate of 10° C./min., was strand pelletized using a co-rotating, twin-screw extruder. The pelletized resin was then processed by conventional blown film extrusion with a 4" diameter die at 50 lbs/hr., 8" frost line height, and 2.2:1 blow up ratio, to produce a 1.25 mil and a 2.5 mil-thick blown film. The films were then tested, with the results for the 1.25 mil film reported in Table 1, and the results for the 2.5 mil film reported in Table 2.

Comparative Example 7

Comparative Example 6 was repeated, with the exception that 1000 ppm (0.1% by weight) of Capatal® 200, a platelet-shaped nano boehmite nucleator having at least 70% by weight of $Al_2O_3$, and a crystallite size of at least 5 nm available from Sasol Germany GmbH, was compounded with the medium molecular weight, high-density polyethylene resin.

Comparative Example 8

Petrothene® LP540200, a medium molecular weight, high-density polyethylene resin having a density of 0.940 g/cm³ according to ASTM D 1505, a melt index of 0.2 g/10 min. at 190° C./2.16 kg, and a peak crystallization temperature ($T_c$) value of 116.3° C., that does not correspond to formula (I), determined according to ASTM D 3418, with an annealing temperature of 160° C. and a cooling rate of 10° C./min., was strand pelletized using a co-rotating, twin-screw extruder. The pelletized resin was then processed by conventional blown film extrusion with a 4" diameter die at 50 lbs/hr., 8" frost line height, and 2.2:1 blow up ratio, to produce a 1.25 mil and a 2.5 mil-thick blown film. The films were then tested, with the results for the 1.25 mil film reported in Table 1, and the results for the 2.5 mil film reported in Table 2.

Comparative Example 9

Comparative Example 8 was repeated, with the exception that 1000 ppm (0.1% by weight) of Capatal® 200, a platelet-shaped nano boehmite nucleator having at least 70% by weight of $Al_2O_3$, and a crystallite size of at least 5 nm available from Sasol Germany GmbH, was compounded with the medium molecular weight, high-density polyethylene resin.

Control Example B

Alathon® M5010x01, a medium molecular weight, high-density polyethylene resin having a density of 0.951 g/cm³ according to ASTM D 1505, a melt index of 1.1 g/10 min. at 190° C./2.16 kg, and a peak crystallization temperature ($T_c$) value of 116.3° C., corresponding to formula (I), determined according to ASTM D 3418, with an annealing temperature of 160° C. and a cooling rate of 10° C./min., was strand pelletized using a co-rotating, twin-screw extruder, without any additives. The pelletized resin was then processed by conventional blown film extrusion with a 4" diameter die at 50 lbs/hr., 8" frost line height, and 2.2:1 blow up ratio, to produce a 1.25 mil and a 2.5 mil-thick blown film. The films were then tested, with the results for the 1.25 mil film reported in Table 1, and the results for the 2.5 mil film reported in Table 2.

Example 10

Platelet-Shaped Nano Boehmite Nucleator

Control Example B was repeated, with the exception that 1000 ppm (0.1% by weight) of Capatal® 200, a platelet-shaped nano boehmite nucleator having at least 70% by weight of $Al_2O_3$, and a crystallite size of at least 5 nm available from Sasol Germany GmbH, was compounded with the medium molecular weight, high-density polyethylene resin.

TABLE 1

1.25 mil films

|  | Dart Drop (g) | Tear Strength MD (g) | Tear Strength TD (g) | Haze (%) | Gloss | Impact Flat (ft-lb) | 1% Secant Mod MD (psi) | Crystallization Half-time (min.) |
|---|---|---|---|---|---|---|---|---|
| Control A | <36 | 19.1 | 280 | 34 | 22 | 0.36 | 148000 | 7.9 |
| Example 1 | 60 | 28.5 | 310 | 30 | 26 | 0.43 | 141000 | 6 |
| Comp. Ex. 1 | 50 | 25.6 | 320 | 37 | 20 | 0.38 | 137000 | 2.4 |
| Comp. Ex. 2 | 48 | 25.5 | 310 | 38 | 18 | 0.38 | 141000 | 2.6 |
| Comp. Ex. 3 | <36 | 23.3 | 310 | 35 | 22 | 0.39 | 140000 | 5.5 |
| Comp. Ex. 4 | 44 | 23.3 | 290 | 37 | 20 | 0.37 | 151000 | 2.8 |
| Comp. Ex. 5 | <36 | 17 | 290 | 43 | 16 | 0.31 | 146000 | — |
| Comp. Ex. 6 | <36 | 21.1 | 340 | 20 | 40 | 0.33 | — | — |
| Comp. Ex. 7 | <36 | 21.1 | 330 | 21 | 39 | 0.36 | — | — |
| Comp. Ex. 8 | <36 | 15.2 | 1500 | 51 | 13 | 0.26 | — | — |
| Comp. Ex. 9 | <36 | 16.5 | 1100 | 56 | 11 | 0.24 | — | — |
| Control B | <36 | 26.4 | 500 | — | — | 0.34 | — | — |
| Example 10 | 56 | 29.8 | 380 | — | — | 0.42 | — | — |

TABLE 2

2.5 mil films

|  | Dart Drop (g) | Tear Strength MD (g) | Tear Strength TD (g) | Haze (%) | Gloss | Impact Flat (ft-lb) | 1% Secant Mod MD (psi) |
|---|---|---|---|---|---|---|---|
| Control A | 99 | 48 | 130 | 41 | 29 | 0.78 | 148000 |
| Example 1 | 138 | 61.4 | 130 | 36 | 33 | 1.02 | 162000 |
| Comp. Ex. 1 | 120 | 52.7 | 140 | 42 | 27 | 0.9 | 146000 |
| Comp. Ex. 2 | 120 | 53.3 | 140 | 42 | 26 | 0.94 | 145000 |
| Comp. Ex. 3 | 99 | 50.4 | 150 | 41 | 30 | 0.86 | 143000 |
| Comp. Ex. 4 | 111 | 53.9 | 140 | 45 | 26 | 0.79 | 147000 |
| Comp. Ex. 5 | 95 | 47 | 120 | 45 | 24 | 0.63 | 149000 |
| Comp. Ex. 6 | 107 | 56 | 150 | 27 | 36 | 0.81 | — |
| Comp. Ex. 7 | 105 | 56.3 | 160 | 28 | 36 | 0.83 | — |
| Comp. Ex. 8 | 107 | 64.6 | 1400 | 58 | 10 | 0.86 | — |
| Comp. Ex. 9 | 92 | 60.2 | 1100 | 62 | 9 | 0.73 | — |
| Control B | 105 | 64.7 | 180 | — | — | 0.81 | — |
| Example 10 | 117 | 78.2 | 140 | — | — | 1.06 | — |

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. A polyethylene composition comprising 0.01% to 1% by weight of at least one platelet-shaped nano boehmite nucleator, wherein the platelet-shaped nano boehmite nucleator comprises at least 70% by weight of $Al_2O_3$ and has a crystallite size of equal to or greater than 60 nm and less than or equal to 80 nm, wherein the platelet-shaped nano boehmite nucleator is in the form of a particle having a particle size ranging from 5 μm to 150 μm, and the polyethylene composition has a density greater than 0.94 g/cm³, a melt index (MI₂) ranging from equal to or greater than 0.3 g/10 min, up to equal to or less than 3 g/10 min., and a peak crystallization temperature (T$_c$) value determined according to ASTM D 3418, with an annealing temperature of 160° C. and a cooling rate of 10° C./min., that corresponds to formula (I):

$$T_c \leq (A*density) - 73.5° C. \quad (I)$$

where A is 200 cm³-° C./g, T$_c$ is in units of ° C., and density is in units of g/cm³.

2. The polyethylene composition according to claim 1, wherein the platelet-shaped nano boehmite nucleator is in the form of the particle having the particle size ranging from 25 μm to 60 μm.

3. The polyethylene composition according to claim 1, wherein the platelet-shaped nano boehmite nucleator has a loose bulk density of 300 g/L to 900 g/L.

4. The polyethylene composition according to claim 1, wherein the platelet-shaped nano boehmite nucleator has a packed bulk density of 500 g/L to 1000 g/L.

5. The polyethylene composition according to claim 1, wherein the platelet-shaped nano boehmite nucleator has a surface area of 50 m²/g to 250 m²/g.

6. The polyethylene composition according to claim 1, wherein the platelet-shaped nano boehmite nucleator has a pore volume of 0.4 mL/g to 1 mL/g.

7. The polyethylene composition according to claim 1, wherein the polyethylene composition comprises from 0.0.1% to 0.5% by weight of the platelet-shaped nano boehmite nucleator.

8. A polyethylene film comprising a polyethylene composition, the polyethylene composition comprising 0.01% to 1% by weight of at least one platelet-shaped nano boehmite nucleator, wherein the platelet-shaped nano boehmite nucleator comprises at least 70% by weight of Al₂O₃ and has a crystallite size of equal to or greater than 60 nm and less than or equal to 80 nm, wherein the platelet-shaped nano boehmite nucleator is in the form of a particle having a particle size ranging from 5 μm to 150 μm; and the polyethylene composition has a density greater than 0.94 g/cm³, a melt index (MI₂) ranging from equal to or greater than 0.3 g/10 min, up to equal to or less than 3 g/10 min., and a peak crystallization temperature (T$_c$) value determined according to ASTM D 3418, with an annealing temperature of 160° C. and a cooling rate of 10° C./min., that corresponds to formula (I):

$$T_c \leq (A*density) - 73.5° C. \quad (1)$$

where A is 200 cm³-° C./g, T$_c$ is in units of ° C., and density is in units of g/cm³.

9. The polyethylene film according to claim 8, wherein the polyethylene composition comprises from 0.01% to 0.5% by weight of the platelet-shaped nano boehmite nucleator.

* * * * *